United States Patent [19]

Sakaki et al.

[11] Patent Number: 5,457,715
[45] Date of Patent: Oct. 10, 1995

[54] METHOD AND DEVICE FOR COMMUNICATING DATA USING A PLURALITY OF LINES

[75] Inventors: Hiroaki Sakaki; Yoshihiro Maei; Masahiro Mochizuki; Yoshiaki Tezuka; Takashi Sakayama; Shinichiro Nagoya; Hideo Kinami; Yasuhiro Kamiyama, all of Saitama, Japan

[73] Assignee: Fuji Xerox Co., Ltd., Tokyo, Japan

[21] Appl. No.: 8,997

[22] Filed: Jan. 26, 1993

[30] Foreign Application Priority Data

| Jan. 28, 1992 | [JP] | Japan | 4-035826 |
| Feb. 4, 1992 | [JP] | Japan | 4-047608 |

[51] Int. Cl.⁶ .............................. H04K 1/10; H04L 27/28
[52] U.S. Cl. ......................... 375/260; 370/84; 375/267; 375/347; 340/825.03
[58] Field of Search ..................... 375/260, 267, 375/38, 40, 100, 34.7; 340/825.03; 370/84, 112, 118; 455/34.1, 34.2

[56] References Cited

U.S. PATENT DOCUMENTS

| 4,577,312 | 3/1986 | Nash | 375/38 |
| 4,704,716 | 11/1987 | Bowers et al. | 375/38 |
| 4,775,987 | 10/1988 | Miller | 375/38 |
| 5,231,649 | 7/1993 | Duncanson | 370/84 |
| 5,276,679 | 1/1994 | McKay et al. | 370/84 |
| 5,381,412 | 1/1995 | Otani | 370/84 |

FOREIGN PATENT DOCUMENTS

| 63-78636 | 4/1988 | Japan . |
| 2-15745 | 1/1990 | Japan . |
| 3-62767 | 3/1991 | Japan . |

Primary Examiner—Stephen Chin
Assistant Examiner—William Luther
Attorney, Agent, or Firm—Finnegan, Henderson, Farabow, Garrett & Dunner

[57] ABSTRACT

Disclosed is a data communication method using a plurality of communication lines. In the method, a larger number of communication lines than the number of communication lines to be actually used for communication are connected, then other communication lines are disconnected when the number of communication lines to be actually used for communication are secured, and data are transmitted in parallel by means of the communication lines secured.

11 Claims, 11 Drawing Sheets

1

METHOD AND DEVICE FOR COMMUNICATING DATA USING A PLURALITY OF LINES

BACKGROUND OF THE INVENTION

1. Field of the Invention

The present invention relates to method and device for communicating data by use of a plurality of communication lines and, in particular, to such data communication method and device suitable for securing and determining a previously set number of communication lines.

2. Description of the Related Art

Conventionally, when data is communicated between communication equipments such as a facsimile or the like by use of a public phone lines network, generally, only a single line is used and data is transmitted by means of a serial transmission system. In such serial transmission system using a single line, when image data having a large quantity of information is transmitted, then the data communication time is quite long. In order to solve this problem, a system (a parallel transmission system) can be provided in which the data is divided into a plurality of blocks and then these block data are transmitted in parallel by use of a plurality of communication lines.

In recent years, there has been developed and gradually but widely used an integrated service digital network (which is hereinafter referred to as ISDN) which is able to transmit data using a plurality of communication lines simultaneously. If the ISDN is used, then the above-mentioned parallel transmission system can be executed with ease. Referring more particularly to the ISDN, it is a communication network which integrates the information of various kinds of communication equipments such as telephones, facsimiles, telexes and the like connected through a bus to a domestic service line terminal unit (DSU) in a digital form to thereby allow the integrated digital data to be communicated in parallel between the above-mentioned communication equipments by use of a plurality of communication lines.

Further, with the widespread use of the ISDN, there has been also studied a communication system in which data is divided into a plurality of block data and the block data are transmitted in parallel at the transmitting end, and the block data are restored to the original data thereof at the receiving end. This is hereinafter referred to as a super-high-speed communication system.

However, the above-mentioned conventional super-high-speed communication system has the following problems:

That is, in the conventional super-high-speed communication system, usable communication lines are previously registered and an appropriate number of communication lines are selected out of the registered ones for data transmission. The conventional system is convenient for the super-high-speed communication because a previously set number of communication lines are secured for the super-high-speed communication. However, since this means that the communication lines are occupied only for the super-high-speed communication, there is no room for use of the communication lines by normal communication.

In other words, when the normal communication interrupts the communication lines, it is not possible to recognize at either of transmitting or receiving end that the lines at the other end are being used by the normal communication. For this reason, even if the transmitting side tries to determine the number of communication lines arbitrarily for the super-high-speed communication, the desired number of communication lines cannot be secured. This is because a large number of communication lines must be always secured for the super-high-speed communication, and, more particularly, because there is no clear standard for determination of special communication lines necessary for the super-high-speed communication.

SUMMARY OF THE INVENTION

The present invention aims at eliminating the drawbacks found in the above-mentioned conventional data communication method.

Accordingly, it is an object of the invention to provide method and device capable of specifying clearly a plurality of communication lines necessary for super-high-speed communication.

It is another object of the invention to provide a usable channel determining method which can determine easily and efficiently a plurality of channels usable in a super-high-speed communication mode.

It is still another object of the invention to provide data communication method and device using a plurality of communication lines which enables normal communication and super-high-speed communication to use a predetermined number of communication lines in common and also can improve a communication efficiency.

To solve the above-mentioned problems and to achieve the above objects, the invention provides a data communication method using a plurality of communication lines, including the steps of connecting a larger number of communication lines than the number of communication lines to be actually used for communication, disconnecting other communication lines when the number of communication lines to be actually used for communication are secured, and transmitting data in parallel by means of the communication lines secured.

Also, the invention provides a data communication device including calling instruction means for issuing calling requests to line control means corresponding in number to a larger number of communication lines than the number of communication lines to be actually used for communication, means for detecting that the number of communication lines to be actually used for communication are connected with the line control means corresponding thereto and for disconnecting other communication lines than the connected communication lines, and means for transmitting divided communication data to a plurality of the connected communication lines.

DETAILED DESCRIPTION OF THE PREFERRED EMBODIMENTS

Figure 2:
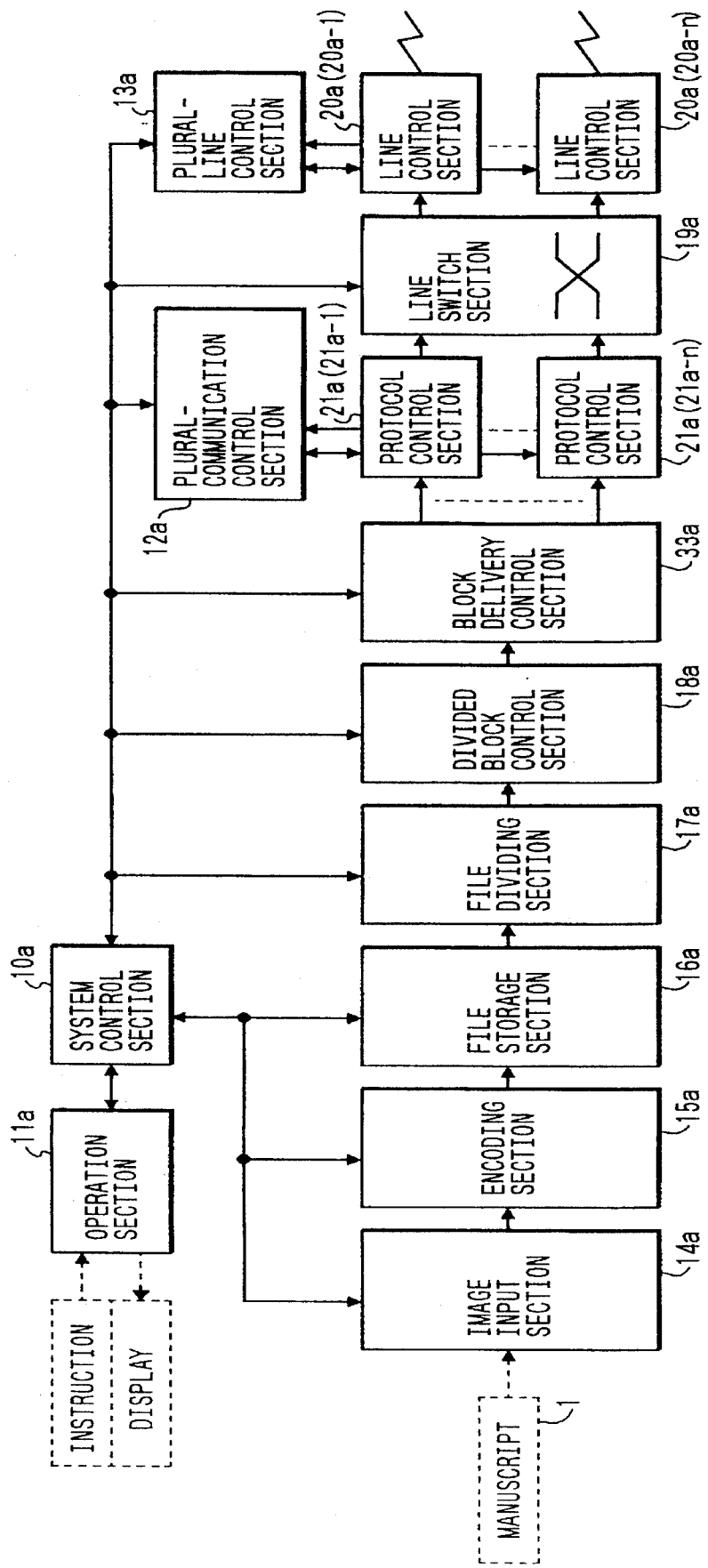
FIG. 2 is a block diagram of the hardware structure of a facsimile provided at a transmitting end according to the invention.
Figure 3:
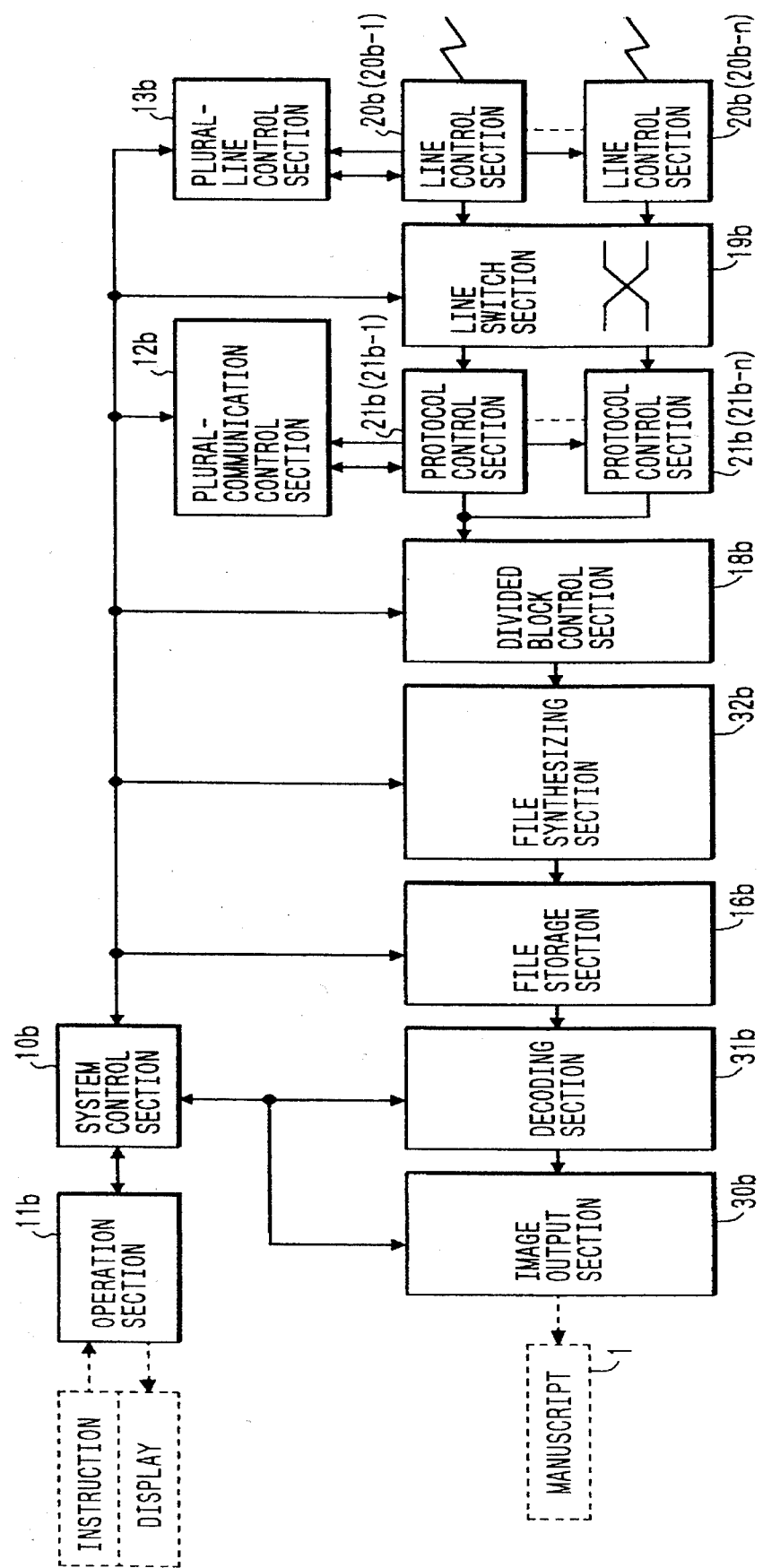
FIG. 3 is block diagram of the hardware structure of a facsimile provided at a receiving end according to the invention.

Description will hereinbelow be given in detail of the invention with reference to the accompanying drawings. FIGS. 2 and 3 are respectively block diagrams of main portions of the hardware structures of facsimiles to which the invention is applied. In other words, in FIGS. 2 and 3, there are shown the structures of the facsimiles respectively provided at the transmitting and receiving ends, the same or equivalent parts are given the same reference numerals, and reference numerals designating the parts at the transmitting end are added a letter "a" respectively, while the reference numerals designating the parts at the receiving end are added a letter "b" respectively, so that they can be distinguished from each other.

In FIG. 2, an operation section 11a includes operation keys such as a ten-key, a function selection key and the like as well as a display unit, and outputs to a system control section 10a the information that corresponds to the contents of operation to be performed by an operator. The system control section 10a is used to control the whole facsimile and is composed of a microcomputer.

An image input section 14a reads manuscript information on a manuscript 1, then converts it into communication data in an electric signal and finally outputs the communication data to an encoding section 15a. The encoding section 15a compresses and encodes the communication data and then outputs such data to a file storage section 16a.

The file storage section 16a stores the encoded communication data as an image file. A file dividing section 17a reads out the communication data stored in the file storage section 16a according to the data sizes that are previously set therein, and then transfers the read-out communication data to a divided block control section 18a. That is, the communication data stored in the file storage section 16a is divided into a plurality of block data. The divided block control section 18a adds management information, which will be described later in connection with FIG. 5, to the divided communication data, and then outputs the divided block data with management information to a block delivery control section 33a.

The block delivery section 33a assigns and transfers the respective block data to respective protocol control sections 21a-1 through 21a-n sequentially. The respective protocol control sections 21a-1 through 21a-n protocol process the block data supplied thereto similarly to normal image information, and then transmit the protocol-processed block data to a receiving station by means of line control sections 20a-1 through 20a-n respectively. A plural-communication control section 12a issues an instruction to the respective protocol control sections 21a-1 through 21a-n and also transfers to the system control section 10a signals which are sent thereto from the respective protocol control sections 21a-1 through 21a-n.

The line control sections 20a-1 through 20a-n, when transmission instructions are applied thereto by means of a one-touch dial, an abbreviated dial and the like, dial automatically to call the receiving station and connect communication lines with the receiving station.

A line switch section 19a, responsive to the instruction from the system control section 10a, connects the respective protocol control sections 21a-1 through 21a-n with the respective line control sections 20a-1 through 20a-n appropriately. The line control sections 20a-1 through 20a-n are respectively controlled by the plural-line control sections 13a.

On the other hand, in FIG. 3, a file synthesizing section 32b synthesizes a plurality of block data, which are delivered from a divided block control section 18b, in accordance with the management information thereof, and outputs the synthesized data to a file storage section 16b. A decoding section 31b decodes the communication data stored in the file storage section 16b. An image output section 30b records and restores the decoded communication data.

Figure 5:
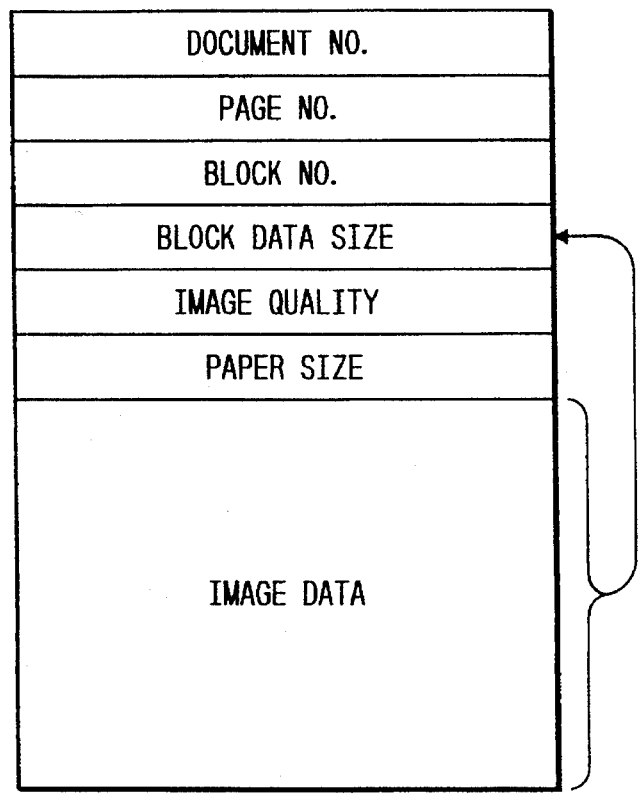
FIG. 5 is a view of the data structure of block data.

Next, description will be given below of an embodiment of the data structure of the above-mentioned block data with reference to FIG. 5. As shown in FIG. 5, the block data includes management information such as document No., page No., block No., block data size, image quality, paper size and the like, as well as image information data. However, this data structure is just an example and, for example, if the division unit or division size of the communication data is fixed to a given value, then the block data size can be omitted from the structure.

Figure 4:
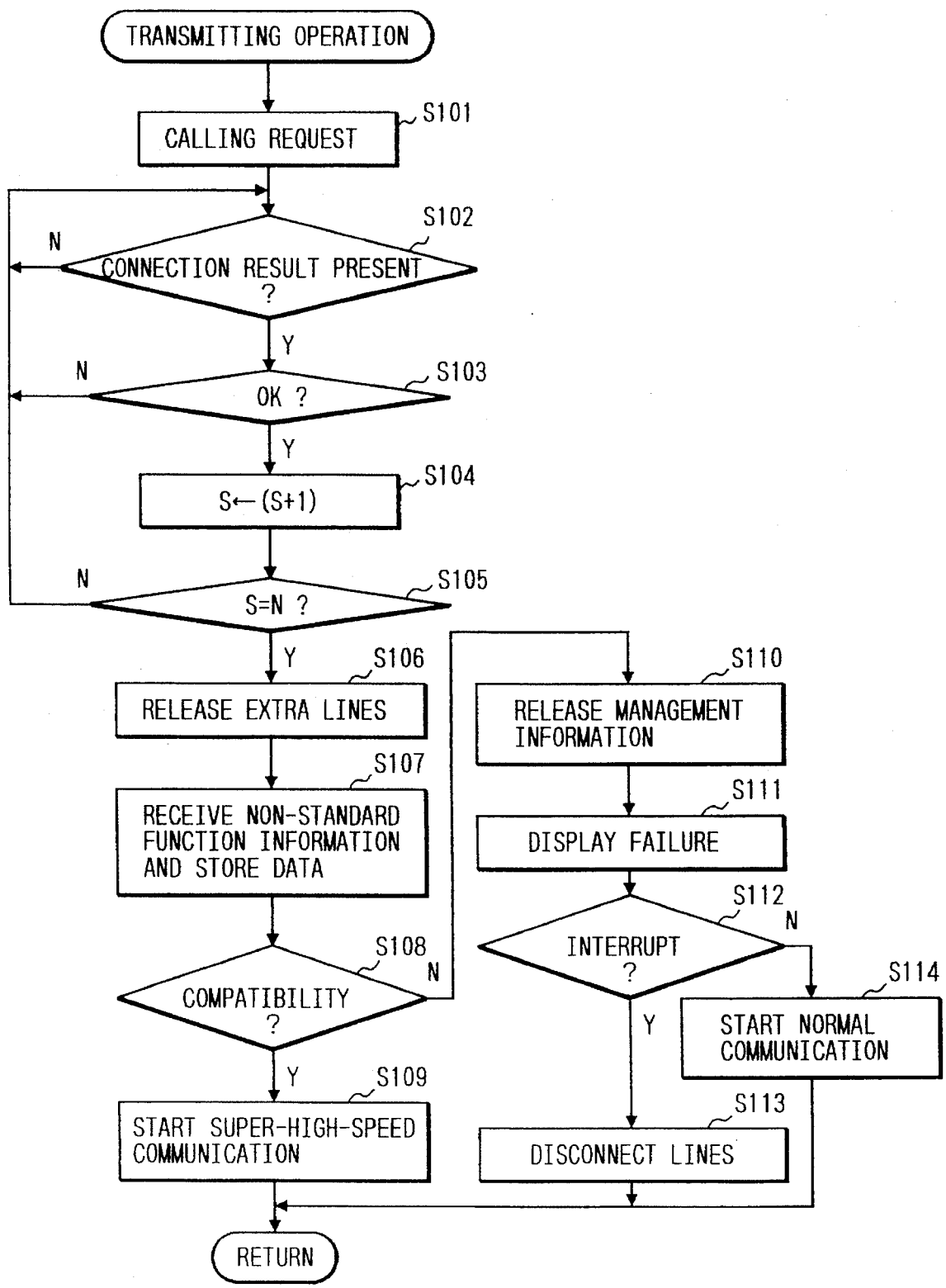
FIG. 4 is a flow chart of transmitting operations employed in the embodiment.

Next, description will be given below of the communication operations of a transmitting station according to an embodiment of the invention with reference to FIG. 4. In FIG. 4, in Step S101, call requests are issued to the line control sections 20a-1 through 20a-n registered in the transmitting station for a larger number of communication lines than the number of communication lines to be used actually for communication. As a standard to determine the number of communication lines to be actually used, the size of the quantity of communication data, the degree of emergency of transmission and the like may be added. The degree of emergency of transmission can be judged, for example, by an instruction input from an operation panel when the operation panel is operated by an operator, while the quantity of communication data can be judged from the quantity of data stored in the file storage section 16b. The line control section 20a that has received the call request connects a call which is suitable for the line interface.

In Step S102, the processing waits for the result of the above connecting processing. If the result of the connecting processing is given from the line control section, then the processing advances to Step S103, in which it is checked whether the result of the connecting processing is OK or not. If it is found OK in Step S103, then the processing advances to Step S104. In Step S104, a parameter S indicating the number of communication lines which have been found OK for connection is incremented. In this case, however, it is assumed that the parameter S is cleared in its initialization mode.

If it is found not OK in Step S103, then the processing goes back to Step S102, in which it waits for the connection result that is supplied from other line control section.

In Step S105, the number N of communication lines to be actually used for communication is compared with the above-mentioned parameter S, that is, the number of communication lines that have been found OK for connection, and it is checked whether the number of communication lines OKed for connection reaches the number of communication lines to be actually used for communication. If it does not reach the number of communication lines to be actually used for the current communication, that is, a required number of communication lines, then the processing goes back to Step S102, in which it waits for the report of the connecting result to be supplied from other line connecting section.

The above-mentioned operations are performed repeatedly and, if the required number of communication lines are connected, then the judgement in Step S105 is yes and the processing advances to Step S106. In Step S106, the lines, which have not been checked yet for the results of the connection processings, are released.

In Step S107, a protocol control section corresponding to the connected line control section is initiated to execute protocol communication to thereby receive non-standard function information from the other station, and stores the received data in the storage area of the system control section 10a. The above-mentioned non-standard function information can be obtained by an NSF signal in a G3 communication mode and by an RSSP signal in a G4 mode. The non-standard function information includes the declaration of a super-high-speed communication mode.

In Step S108, it is checked whether compatibility with the other station is secured or not, that is, the declaration of the super-high-speed communication mode is present or not. If the compatibility is found secured, then the processing advances to Step S109, in which the effect that data transmission in the super-high-speed communication mode is started is notified to the other station, that is, a super-high-speed communication instruction command is transmitted to the other station and, after then, the super-high-speed communication is started. In other words, the data that is read out from the file storage section 16a is divided into a plurality of block data, the divided block data are respectively transferred to the protocol control sections that are instructed by the plural control section 12a, out of the protocol control sections 21a-1 through 21a-n, and the block data are then transmitted to the other station by means of the line control sections that are respectively connected with the above protocol control sections.

On the other hand, if compatibility is found not secured in Step S108, then the processing goes to Step S110, in which the management information on the super-high-speed communication is all released. In Step S111, in order to notify the operator of the fact that the super-high-speed communication has failed, the failure of the high-speed communication is displayed on the display unit of the operation section 11a.

After displaying the failure of the super-high-speed communication, the communication lines may be cut off to interrupt the processing, or, alternatively, in accordance with a previously set instruction, the super-high-speed communication may be switched to normal communication, that is, communication to be executed according to a serial transmission method.

In Step S112, it is checked whether the processing is interrupted or not, and if the judgement of this step is yes, then the processing goes to Step S113, in which the communication lines are cut off or disconnected. If not, the processing goes to Step S114, in which the super-high-speed communication is switched to the normal communication.

The receiving station side receives the communication data according to the communication procedures that correspond to the above-mentioned procedures of the transmitting station side. To receive the super-high-speed communication, the receiving station initiates the divided block control section 18b, file synthesizing section 32b and file storage section 16b to thereby place the super-high-speed communication mode in the wait state. After then, the communication data (block data) that are taken from the secured line control sections are put into the divided block control section 18b, in which the data are adjusted in arrangement in accordance with the management information of the block data. The rearranged block data are synthesized in the file synthesizing section 32b and the synthesized data is then stored in the file storage section 16b.

Figure 6:
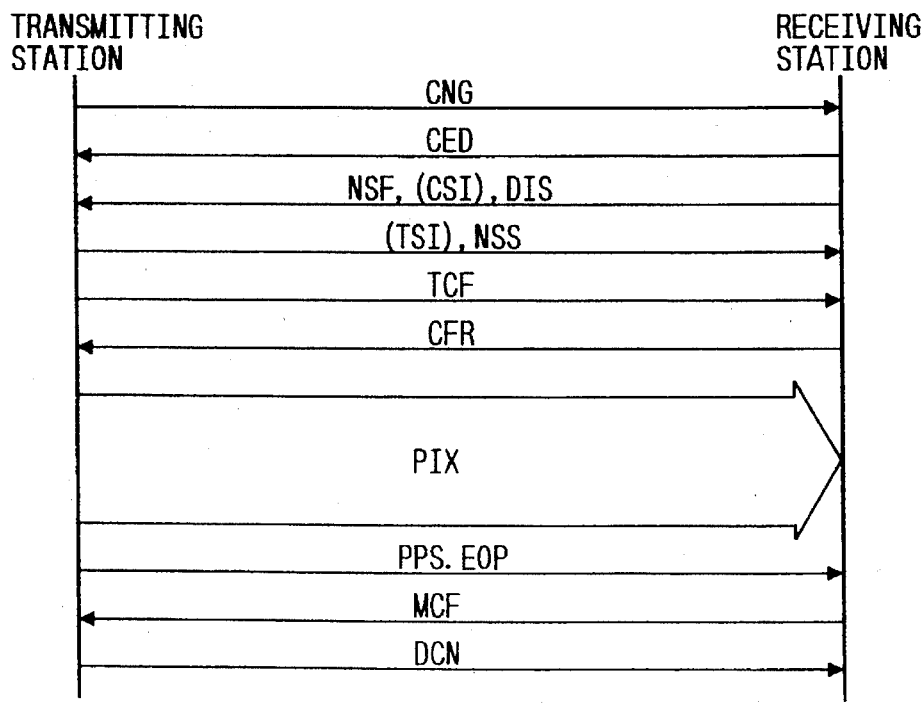
FIG. 6 is a sequence view of protocols in a G3 mode.

Referring now to FIG. 6, there are shown examples of the protocols to be used in the G3 communication mode. In FIG. 6, a CNG signal (a calling signal) is transmitted from the transmitting station to the receiving station. On detecting the CNG signal, the receiving station transmits a CED signal (a called station identification signal) and further transmits an NSF signal (a non-standard function setting signal) and a DIS signal (a digital identification signal).

If the receiving station includes the super-high-speed communication mode, then it declares the super-high-speed communication mode in the NSF signal. In the present embodiment, the compatibility is checked in accordance with the presence or absence of the declaration of the super-high-speed communication mode.

On receiving the NSF signal, the transmitting station adds to an NSS signal (a non-standard function setting signal) information telling that the super-high-speed communication is started, and then transmits the NSS signal with such information to the receiving station.

After then, a TCF signal (a training check signal) is transmitted from the transmitting station and, responsive to this, a CFR signal (a reception preparation confirmation signal) is transmitted from the receiving station. On detecting the CFR signal, the transmitting station transmits the block data. On completion of transmission of all block data, an EOP signal (an end-of-procedure signal) is transmitted from the transmitting station. On detecting the EOP signal, the receiving station transmits an MCF signal (a message confirmation signal) and, finally, the transmitting station transmits a DCN signal (a line disconnection instruction signal) to thereby end the present communication.

Figure 1:
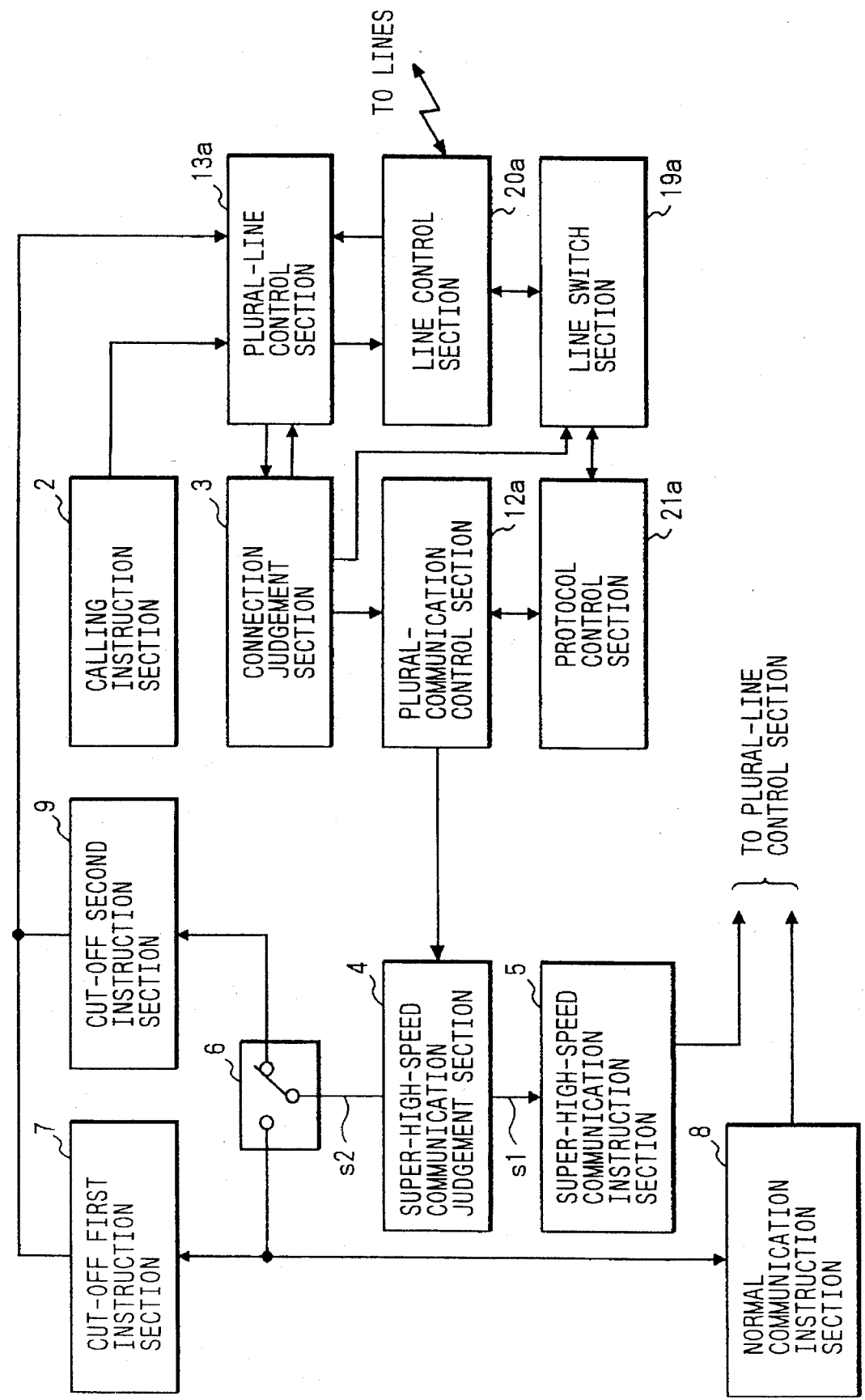
FIG. 1 is a block diagram of main functions of a facsimile, illustrating an embodiment according to the invention.

Next, description will be given below of main functions for enforcing the operations of the present embodiment with reference to a function block diagram of the transmitting station side equipment shown in FIG. 1. In FIG. 1, the same reference numerals as those in FIGS. 2 and 3 designate the same or equivalent sections.

A calling instruction section 2 issues a calling request to the plural-line control section 13a in order to allow more line control sections 20a in number than a previously set number of communication lines to be used to connect lines. The plural-line control section 13a instructs the line control sections 20 corresponding to the specified lines to connect lines.

The results of the connection processings by the line control sections 20a are input through the plural-line control section 13a to a connection judgement section 3. On detecting that communication lines equal in number to the previously set number of communication lines to be used have been connected, the connection judgement section 3 gives the plural-line control section 13a an instruction to release the communication lines that are not connected yet at that time.

Further, the connection judgement section 3 outputs to the line switch section 19a a control signal which connects the line control sections 20a corresponding to the connected communication lines with the protocol control sections 21a. If the line control sections 20a are connected with the plural-communication control section 12a, then the plural-communication control section 12a issues a protocol start request to the protocol control sections 21a.

The results of the protocols are supplied from the plural-communication control section 12a to the super-high-speed communication judgement section 4. The super-high-speed communication judgement section 4, in accordance with the protocol results, checks compatibility with the other station, that is, if the super-high-speed communication is possible or not. If compatibility is found secured, then the super-high-speed communication judgement section 4 outputs a signal s1 and, if not, then the section 4 outputs a signal s2.

Responsive to the signal s1, a super-high-speed communication instruction section 5 outputs to the plural-line control section 13a an instruction which notifies of start of the super-high-speed communication.

Also, in accordance with the setting of a setting section 6, the signal s2 is supplied to a cut-off first instruction section 7 and a normal communication instruction section, or to a cut-off second instruction section 9. The cutting first instruction section 7, responsive to the signal s2, instructs the plural-line control section 13a to connect all communication lines but one communication line. Also, at the same time, the normal communication instruction section 8 outputs to the plural-line control section 13a a signal to instruct start of normal communication, that is, communication according to a serial transmission method using one communication line.

Also, responsive to the signal s2, the cut-off second instruction section 9 outputs to the plural-line control section 13a an instruction to cut off all of the connected communication lines and interrupt the communication.

As has been described heretofore, according to the present embodiment, the calling requests are issued to a plurality of communication lines simultaneously and, when a number of communication lines necessary for the super-high-speed communication are secured, the remaining lines are released so that they can be used for the normal communication as well.

As can be clearly understood from the foregoing explanation, according to the invention, the following effects can be obtained:

(1) Due to the fact that the connection processings are performed on more than the number of communication lines necessary for the super-high-speed communication, when compared with a case in which callings are requested of the number of communication lines necessary for the super-high-speed communication, there can be provided a higher possibility that the desired number of communication lines can be secured, and also time and labor can be saved.

That is, when the connection processings are tried on the necessary number of communication lines but in vain, the specification of the communication lines must be changed and the connection processings must be performed on the other communication lines. On the other hand, according to the invention, the time and labor for this operation can be saved.

(2) If the other station does not include a super-high-speed communication mode, the communication operation can be interrupted or the communication operation can be switched to a communication operation according to a serial transmission method and, therefore, proper measures can be taken to meet the situation.

Next, description will be given below of determination of special communication lines necessary for super-high-speed communication.

Figure 7:
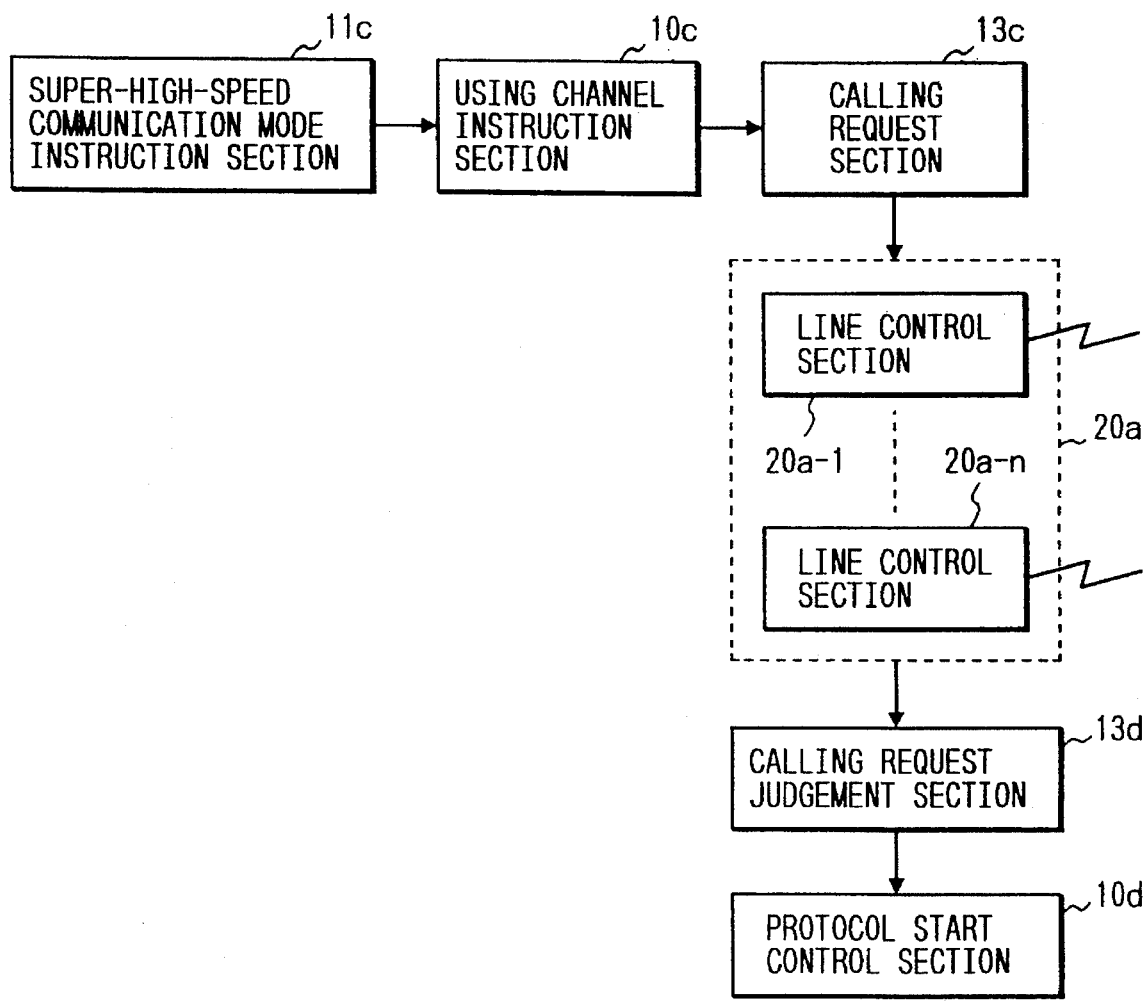
FIG. 7 is a block diagram of the functions of the invention.

FIG. 7 illustrates a function block diagram of main portions of the present invention. In FIG. 7, reference numeral 11c designates a super-high-speed communication mode instruction section which is a function of the operation section 11a previously described, 10c designates for a using channel instruction section which is a function of the system control section 10a, and 13c designates a calling request section which is a function of the plural-line control section 13a. Also, 20a (20a-1 through 20a-n) designates a line control section. Further, 13d designates a calling result judgement section which is a function of the plural-line control section 13a, and 10d designates a protocol start control section which is a function of the system control section 10a.

If the super-high-speed communication mode instruction section 11c issues an instruction to execute communication in a super-high-speed communication mode, then the using channel instruction section 10c gives the calling request section 13c an instruction to determine the channels to be used for communication. In accordance with the instruction from the using channel instruction section 10, the calling request section 13c requests callings from the respective line control sections 20a-1 through 20a-n. Responsive to the calling requests, the line control sections 20a-1 through 20a-n start calling operations, respectively.

The results of these calling operations, that is, the results as to whether their respective communication lines have been connected to the other station or not are checked in the calling result judgement section 13d, and the protocol start control section 10d starts a protocol communication with the other station to which the communication lines have been connected.

Figure 8:
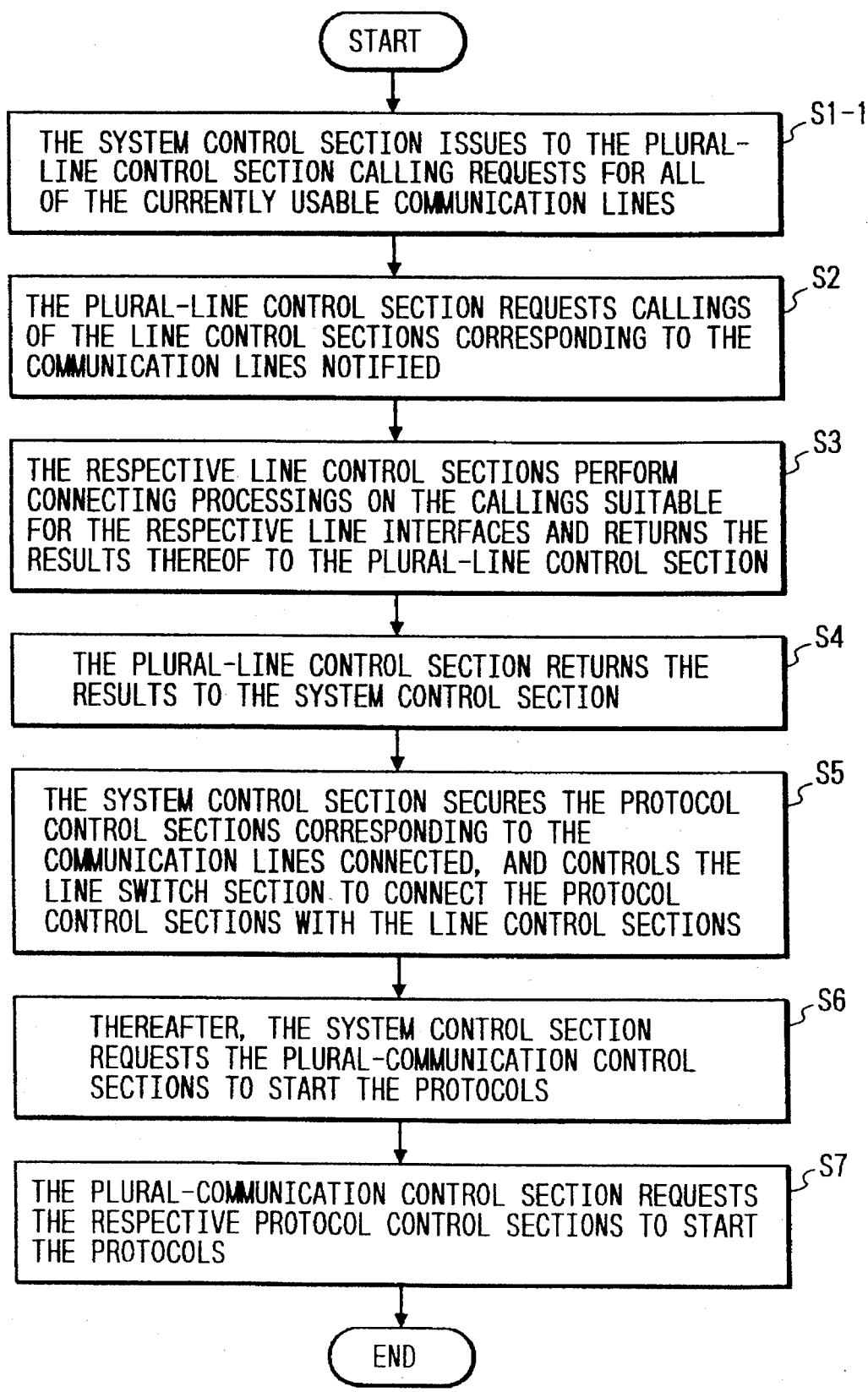
FIG. 8 is a flow chart of the operations of a first embodiment according to the invention.

Next, a first embodiment according to the invention will be described below with reference to FIG. 8 which is a flow chart used to explain the operation of the first embodiment.

In Step S1-1, on receiving from the operation section 11a an instruction to execute communication in a super-high-speed communication mode, the system control section 10a instructs the plural-line control section 13a to issue calling requests to all of the currently usable communication line.

On receiving the calling requests, the plural-line control section 13a issues calling requests to the line control sections 20a respectively corresponding to the notified communication lines in Step S2. In the present embodiment, callings are requested from all of the currently vacant communication lines. In Step S3, the line control sections that have received the calling requests respectively perform connection processings on the respective line interfaces, and then return the connection processing results to the plural-line control section 13a. The plural-line control section 13a, in Step S4, further returns the connection processing results to the system control section 10a.

In Step S5, the system control section 10a secures the protocol control sections 21a corresponding in number to the connected communication lines, and controls the line switch section 19a to connect the protocol control sections 21a with the line control sections 20a. Then, the processing advances to Step S6, and the system control section 10a issues a protocol start request to the plural-communication control section 12a. In Step S7, the plural-communication control section 12a issues protocol start requests to the protocol control sections 21a secured in Step S5, respectively. In the following steps, the protocol procedure is executed for each of the connected communication lines and, if the communication condition is secured with respect to the other equipment, then the image data communication by means of a plurality of communication lines is executed. However, this communication operation is beyond the scope of the invention and thus the description thereof is omitted here.

As described above, according to the present embodiment, since all of the vacant communication lines can be used to transmit the image data, the communication channels can be used efficiently and the communication time can be reduced. Also, the image data communication according to the present embodiment has no influence on the communication lines being currently used and, therefore, the communication can be executed in harmony with the other communication.

Figure 9:
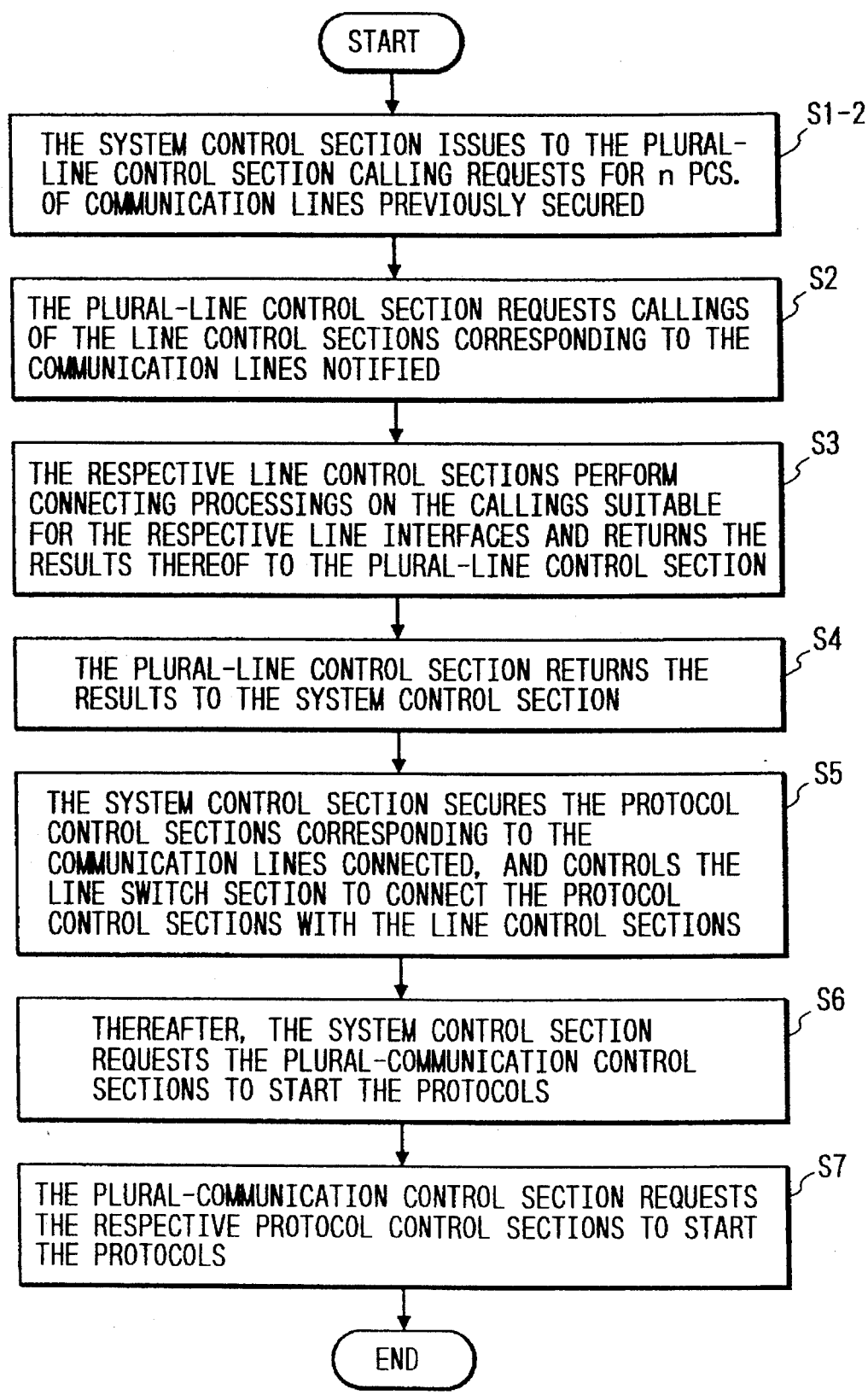
FIG. 9 is a flow chart of the operations of a second embodiment according to the invention.

Next, description will be given below of a second embodiment according to the invention with reference to FIG. 9. The second embodiment is similar to the first embodiment except for Step S1-2 and thus only this step will be described here.

In Step S1-2, the system control section 10a previously secures n (n is an arbitrary integral number) pcs. of communication lines for the super-high-speed communication and, on receiving from the operation section 11a an instruction to execute communication in a super-high-speed communication mode, the system control section 10a requests callings of the n pcs. of communication lines.

According to the second embodiment, because the n pcs. of communication lines are always secured, the super-high-speed communication in emergency can be guaranteed.

Figure 10:
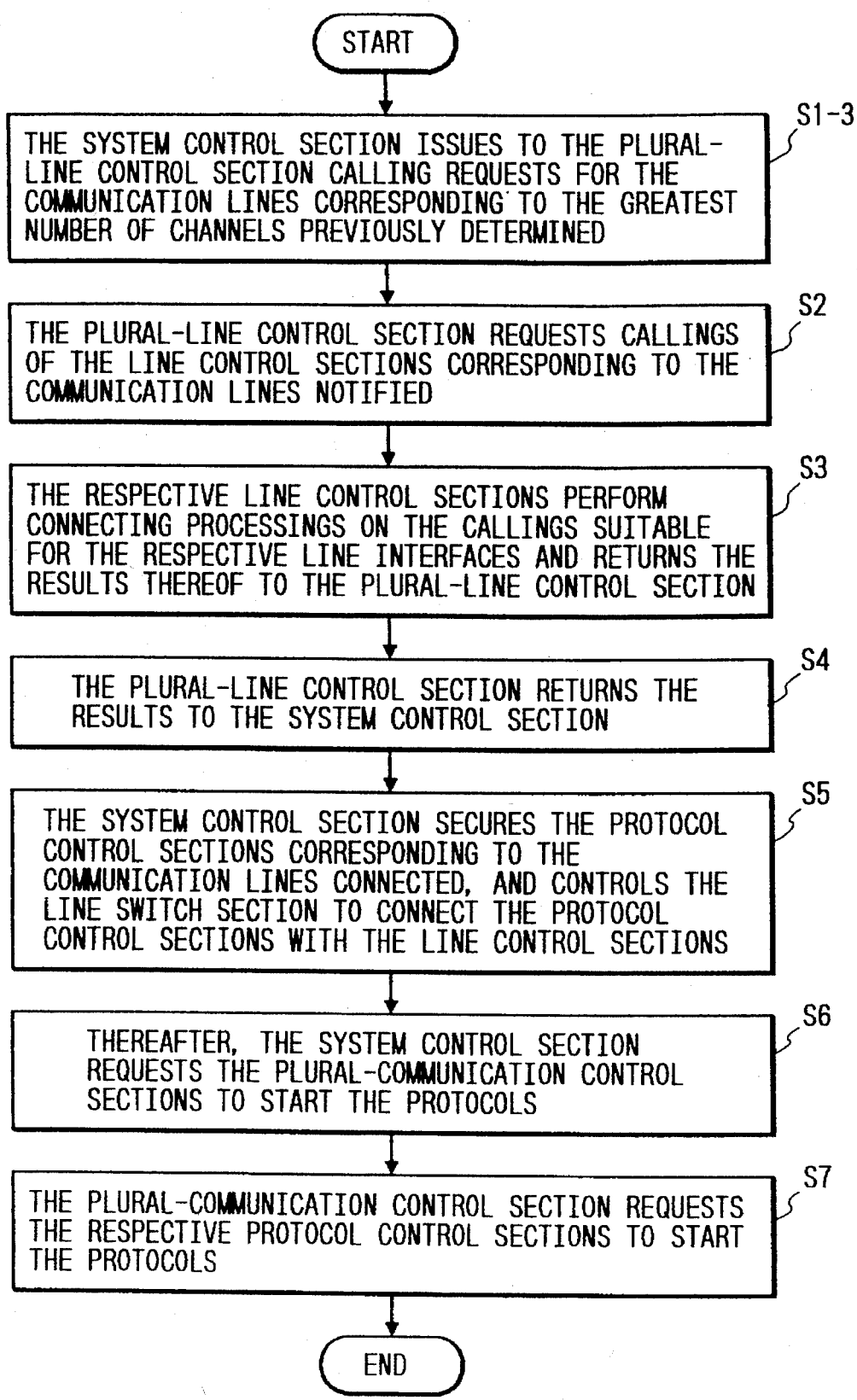
FIG. 10 is a flow chart of the operations of a third embodiment according to the invention.

Next, description will be given below of a third embodiment according to the invention with reference to FIG. 10. The third embodiment is similar to the first embodiment except for Step S1-3 and thus only this step will be described here.

In Step S1-3, the system control section 10a previously determines the maximum number m (m is an arbitrary integral number) of communication lines to be used for the super-high-speed communication and, on receiving from the operation section 11a an instruction to execute communication in a super-high-speed communication mode, the system control section 10a requests callings within the range of the m pcs. of communication lines.

According to the third embodiment, since the number of communication lines to be used for one super-high-communication is limited, vacant communication lines can be secured even during the super-high-speed communication and thus, when there occurs a request for other communication, the communication can be executed by use of the vacant communication lines. Also, the third embodiment can prevent the communication rate from increasing.

Figure 11:
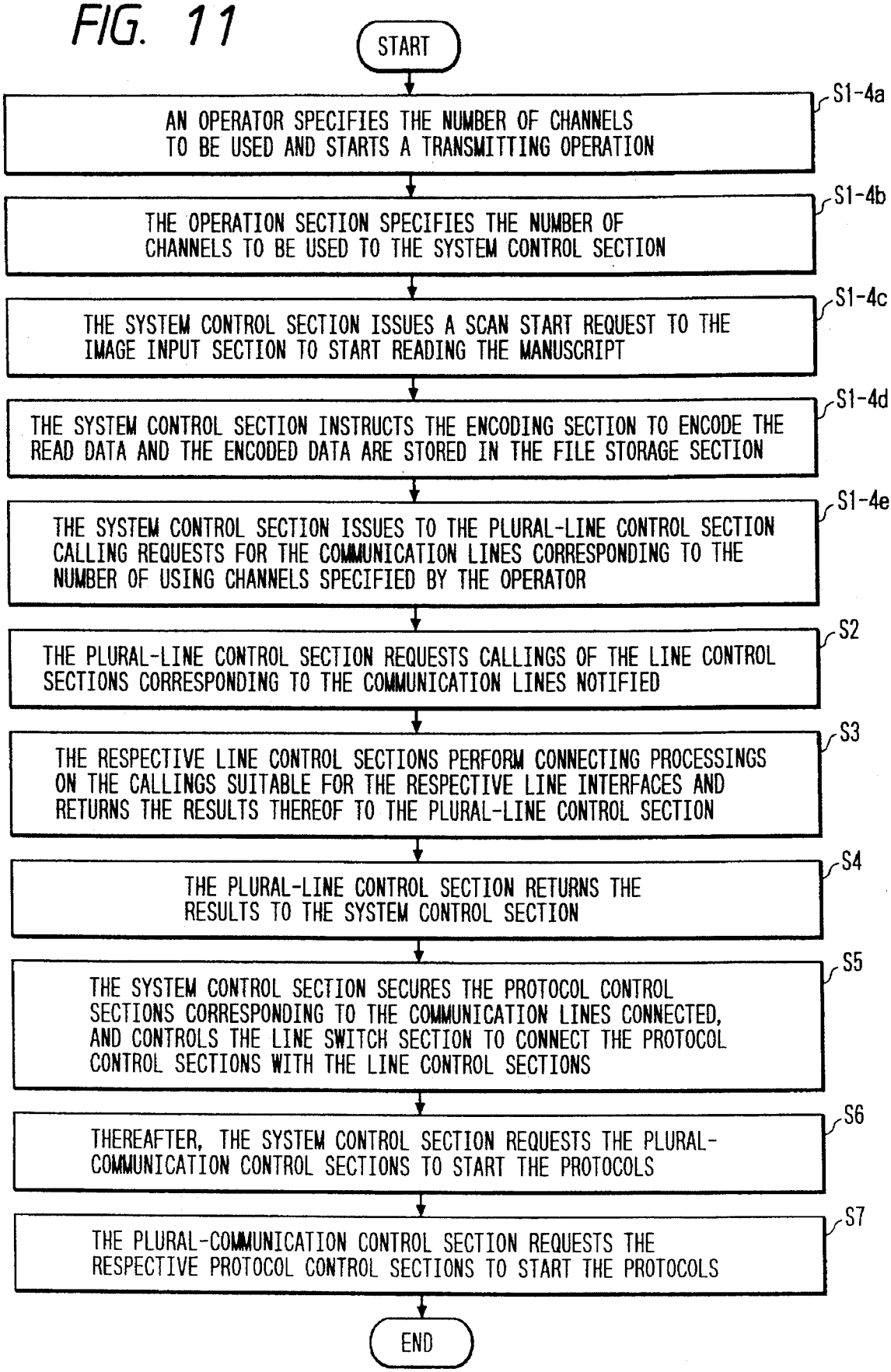
FIG. 11 is a flow chart of the operations of a fourth embodiment according to the invention.

Next, description will be given below of a fourth embodiment according to the invention with reference to FIG. 11. The fourth embodiment is similar to the first embodiment except for Steps S1-4a through S1-4e and thus only these steps will be described here and the remaining steps will be omitted here.

In Step S1-4a, an operator gives an instruction as to the number of channels to be used from the operation section 11a and performs a transmitting operation. In Step S1-4b, the operation section 11a gives the system control section 10a an instruction as to the number of channels to be used. Also, on receiving the transmitting instruction, the system control section 10a issues a manuscript scan start request to the image input section 14a. Responsive to this, the image input section 14a starts to read a manuscript (Step S1-4c).

In Step S1-4d, the system control section 10a gives an instruction to the encoding section 15a to encode the data read. The encoded data is stored in the file storage section 16a. Next, the processing advances to Step S1-4e, the system control section 10a gives the plural-line control section 13a an instruction to request callings to the communication lines corresponding in number to the number of channels to be used instructed by the operator.

According to the fourth embodiment, the number of channels to be used can be freely determined according to the wishes of the operator. This makes it possible to instruct the number of channels suitable for the quantity of the image data to be transmitted. Therefore, there is eliminated the possibility that more than a required number of communication lines may be used when the quantity of data is small to trouble other communication, and that the communication rate may be wasted.

Figure 12:
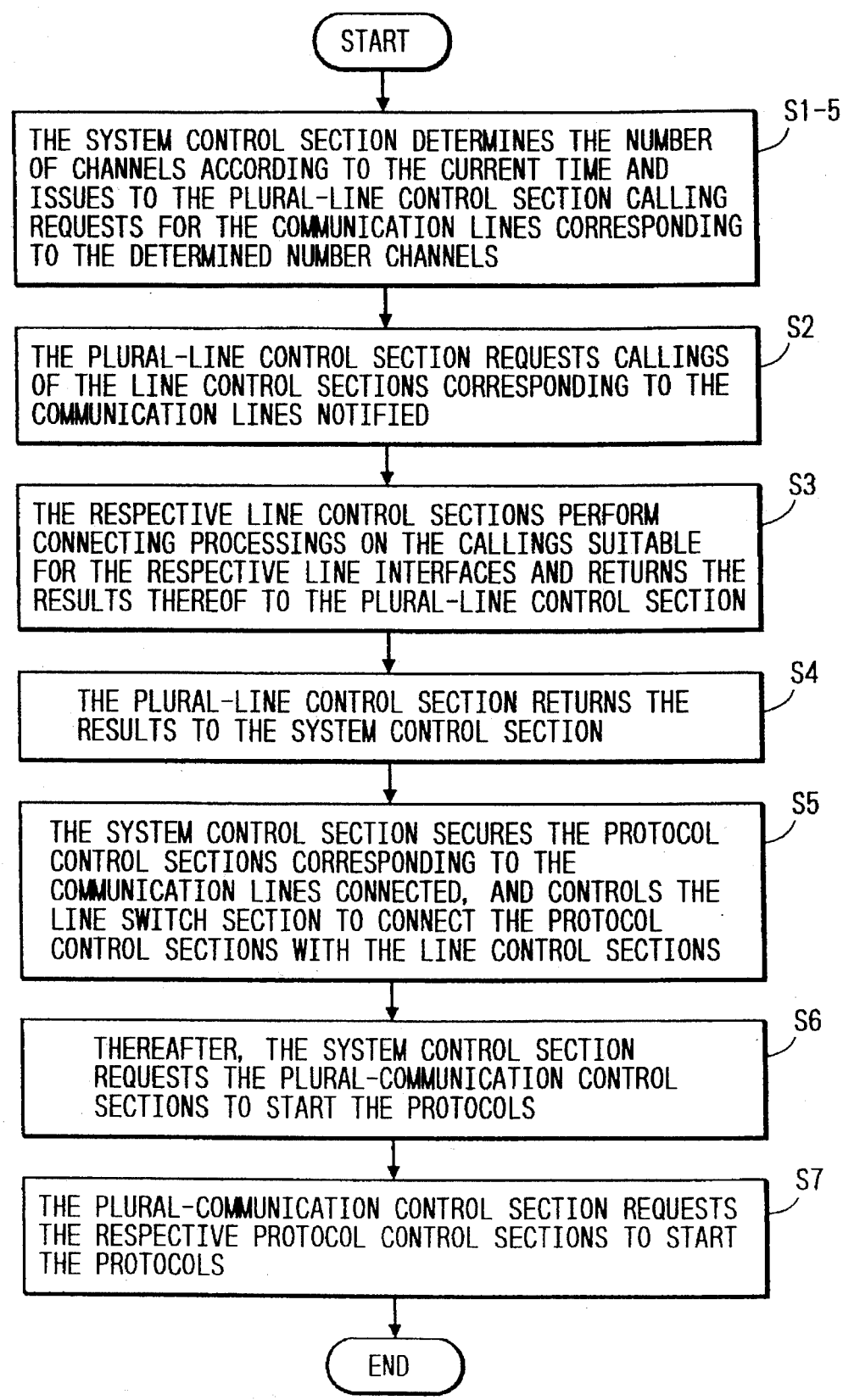
FIG. 12 is a flow chart of the operations of a fifth embodiment according to the invention.

Next, description will be given below of a fifth embodiment according to the invention with reference to FIG. 12. The fifth embodiment is similar to the first embodiment except for Step S1-5 and thus only this step will be discussed here.

In Step S1-5, the system control section 10a determines the number of channels to be used for the super-high-speed communication in accordance with the current time. For example, since a facsimile is generally used quite frequently about 9 o'clock in the morning and about 5 o'clock in the afternoon on Monday through Friday, the number of channels to be used is reduced; and, because the frequency of use of the facsimile is decreased in the remaining periods of time, the number of channels to be used is increased.

According to the fifth embodiment, the number of channels to be secured for the super-high-speed communication can be reduced in the rush hours of communication and, therefore, the effective use of the communication channels can be realized.

As can be understood from the foregoing explanation, according to the invention, in a super-high-speed communication which transmits communication data in parallel by use of a plurality of communication lines, the number of communication channels to be used can be determined easily and also the super-high-speed communication can be executed in harmony with other kinds of communication.

What is claimed is:

1. A data communication method for communicating with a receiving station using a plurality of communication lines, comprising steps of:

initiating a procedure of connecting a larger number of communication lines than the number of actual communication lines to be used for the communication;

releasing from said procedure, after said number of actual communication lines are secured by said procedure, communication lines which are under said procedure and are not secured by said procedure; and transmitting data in parallel by means of said secured communication lines.

2. The data communication method as set forth in claim 1, wherein if the receiving station does not include a super-high-speed communication mode, then said secured communication lines are disconnected to interrupt the transmitting of data in parallel.

3. The data communication method as set forth in claim 1, wherein if the receiving station does not include a super-high-speed communication mode, then said secured communication lines except one secured communication line are disconnected and data are transmitted according to a serial transmission method.

4. A data communication device for communicating from a transmitting station to a receiving station, comprising:

calling instruction means for issuing calling requests to a larger number of line control means than the number of actual communication lines to be used for the communication;

means for detecting that said actual communication lines to be used for the communication are connected with said line control means corresponding thereto;

means for stopping said calling requests to said line control means other than said line control means connected with said actual communication lines; and means for transmitting divided communication data to a plurality of said connected communication lines.

5. The data communication device as set forth in claim 4, further comprising:

judgement means for checking whether the transmitting and receiving stations are compatible; and line cut-off means for disconnecting all of said connected actual communication lines when said judgement means finds that said compatibility is not present.

6. The data communication device as set forth in claim 4, further comprising:

judgement means for checking whether the transmitting and receiving stations are compatible;

line cut-off means for disconnecting said connected communication lines except one connected communication line when said judgement means finds that said compatibility is not present; and means for transmitting communication data by use of said one connected communication line.

7. A method of data communication between a transmitting station and a receiving station using a plurality of communication lines wherein each of the stations has a function to transmit and receive data by use of a plurality of communication lines, the transmitting station divides original communication data into a plurality of block data and transmits said block data in parallel through said plurality of communication lines connected to the receiving station, and the receiving station synthesizes said block data transmitted thereto through said plurality of communication lines to restore said block data to the original communication data thereof, the method comprising at said transmitting station the steps of:

determining which of the communication lines are unused;

issuing, at the time of start of said data communication by means of said plurality of communication lines, calling instructions to connect and match to the receiving station the unused communication lines;

identifying the communication lines that are connected and matched to said receiving station by said calling instructions; and transmitting said block data through said communication lines identified as connected and matched to said receiving station.

8. A method of data communication between a transmitting station and a receiving station using a plurality of communication lines wherein each of the stations has a function to transmit and receive data by use of a plurality of communication lines, the transmitting station divides original communication data into a plurality of block data and transmits said block data in parallel through said plurality of communication lines connected therebetween, and the receiving station synthesizes said block data transmitted thereto through said plurality of communication lines to restore said block data to the original communication data thereof, the method comprising at said transmitting station the steps of:

reserving a predetermined integral number of said plurality of communication lines;

issuing, at the time of start of said data communication by means of said plurality of communication lines, calling instructions to connect and match to said receiving station a predetermined integral number of reserved communication lines;

identifying communication lines that are connected and matched to said receiving station by said calling instructions; and transmitting said block data through said communication lines identified as connected and matched to said receiving station.

9. A method of data communication between a transmitting station and a receiving station using a plurality of communication lines wherein each of the stations has a function to transmit and receive data by use of a plurality of communication lines, the transmitting station divides original communication data into a plurality of block data and transmits said block data in parallel through said plurality of communication lines connected therebetween, and the receiving station synthesizes said block data transmitted thereto through said plurality of communication lines to restore said block data to the original communication data thereof, the method comprising at said transmitting station the steps of:

determining a greatest number of channels for said data communication;

issuing, at the time of start of said data communication by means of said plurality of communication lines, calling instructions to connect and match to said receiving station communication lines which correspond in number to the greatest number of channels previously determined;

identifying communication lines that are connected and matched to said receiving station by said calling instructions; and transmitting said block data through said communication lines identified as connected and matched to said receiving station.

10. A method of data communication between a transmitting station and a receiving station using a plurality of communication lines wherein each of the stations has a function to transmit and receive data by use of a plurality of communication lines, the transmitting station divides original communication data into a plurality of block data and transmits said block data in parallel through said plurality of communication lines connected therebetween, and the receiving station synthesizes said block data transmitted thereto through said plurality of communication lines to restore said block data to the original communication data thereof, the method comprising at said transmitting station the steps of:

determining a number of manually input channels;

issuing, at the time of start of said data communication by means of said plurality of communication lines, calling instructions to connect and match to said receiving station communication lines which correspond in number to the number of channels manually input;

identifying communication lines that are connected and matched to said receiving station by said calling instructions; and transmitting said block data through said communication lines identified as connected and matched to said receiving station.

11. A method of data communication between a transmitting station and a receiving station using a plurality of communication lines wherein each of the stations has a function to transmit and receive data by use of a plurality of communication lines, the transmitting station divides original communication data into a plurality of block data and transmits said block data in parallel through said plurality of communication lines, and the receiving station synthesizes said block data transmitted thereto through said plurality of communication lines to restore said block data to the original communication data thereof, the method comprising at said transmitting station the steps of:

issuing, at the start of said data communication by means of said plurality of communication lines, calling instructions to communication lines that correspond in number to a number of channels determined in accordance with frequency of line use at the current actual time of day;

identifying communication lines that are connected and matched to said receiving station by said calling instructions; and transmitting said block data through said communication lines identified as connected and matched to said receiving station.

* * * * *